Patented May 5, 1925.

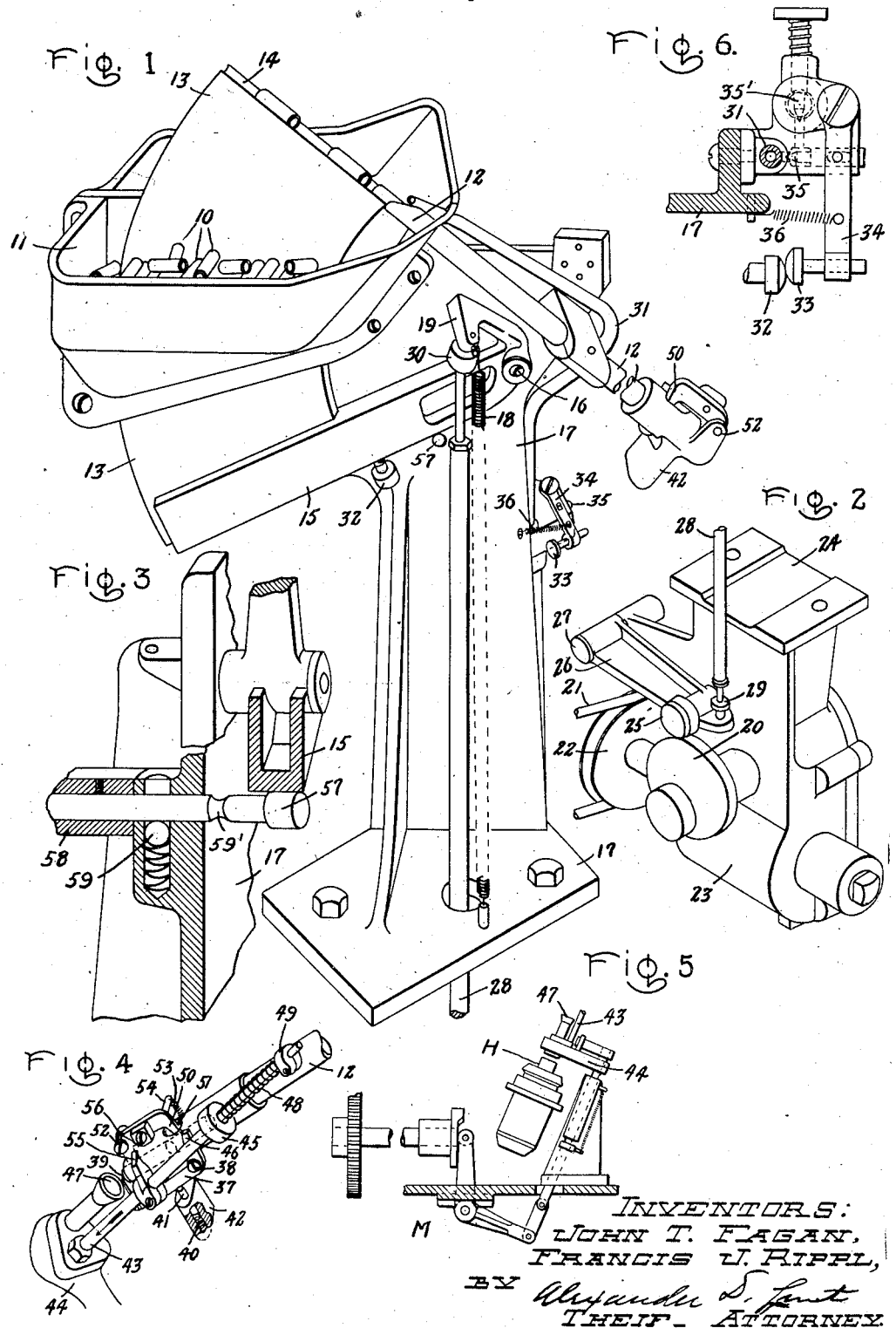

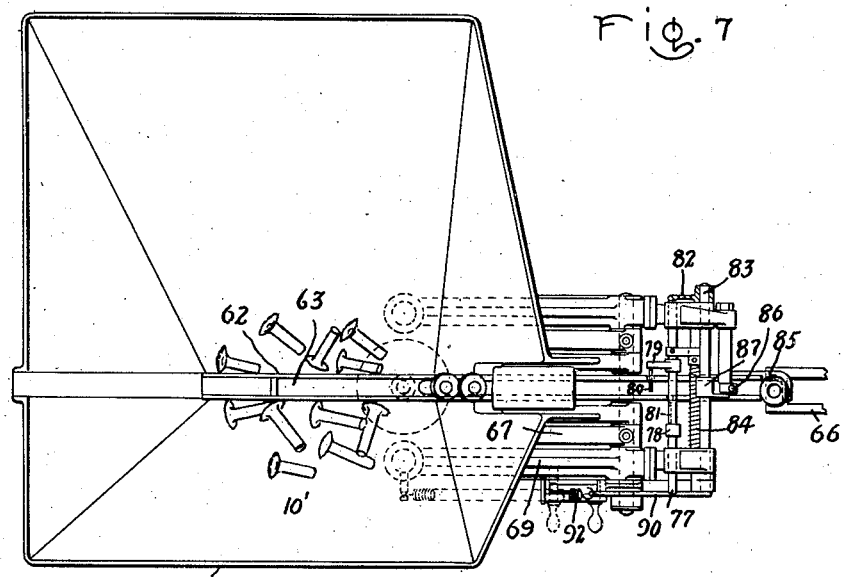
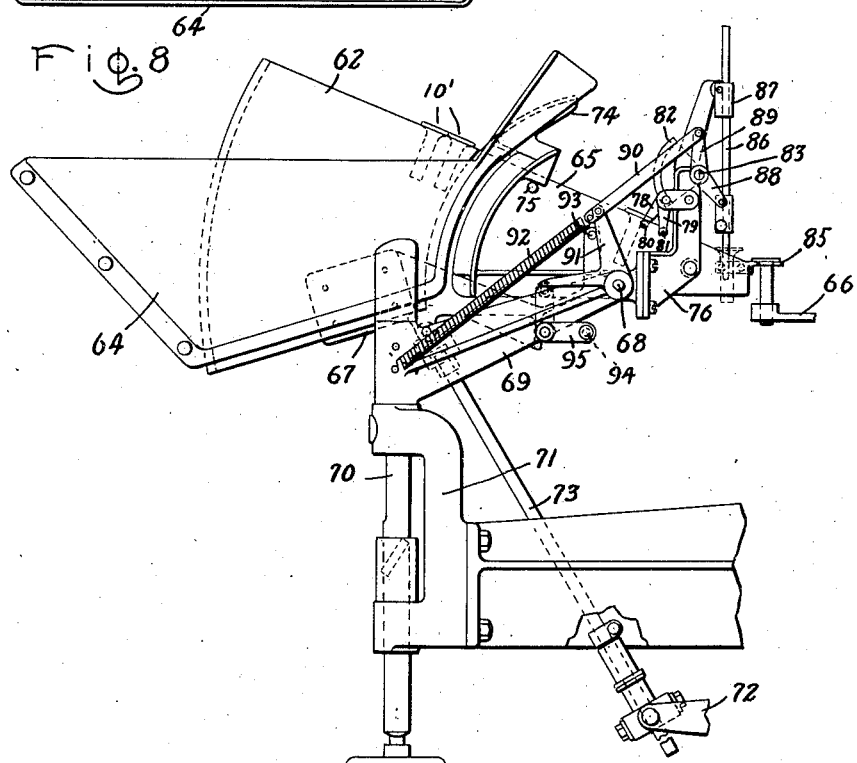

1,536,833

UNITED STATES PATENT OFFICE.

JOHN T. FAGAN AND FRANCIS J. RIPPL, OF CLEVELAND, OHIO, ASSIGNORS TO GENERAL ELECTRIC COMPANY, A CORPORATION OF NEW YORK.

TUBE-FEEDING APPARATUS.

Application filed September 19, 1922. Serial No. 589,249.

*To all whom it may concern:*

Be it known that we, JOHN T. FAGAN and FRANCIS J. RIPPL, citizens of the United States, residing at Cleveland, county of Cuyahoga, State of Ohio, have invented certain new and useful Improvements in Tube-Feeding Apparatus, of which the following is a specification.

Our invention relates to devices for feeding tube blanks to a machine and is particularly adapted for the feeding of glass tubing. For instance, our invention may be used to advantage as a feed for the flaring machine disclosed in Rippl application Serial No. 331,660, filed October 18, 1919. In that machine, glass tubes of the desired length are placed in rotatable holders in a rotatable carrier and are subjected to heating in successive positions after which each tube is engaged by a flaring device. The present invention provides means for automatically feeding the glass tubes to the rotatable holders. Our invention is also applicable to the feeding of the flared tubes to other machines.

In the drawing, Fig. 1 is a perspective view of a feeding means for a flaring machine; Fig. 2 is a perspective view of the means for driving the said feeding means; Fig. 3 is an enlarged fragmentary perspective view, partially in section, of a temporary support for the feed arm; Fig. 4 is a fragmentary perspective of a detail of the feeding means; Fig. 5 is a side elevation of a portion of the flaring machine showing means for operating the feeding means; Fig. 6 is a vertical section of the air valve and operating means therefor; Fig. 7 is a top plan view of a modification which may be used for feeding flared tubes, and Fig. 8 is a side elevation thereof.

The feeding of the glass tubes 10 to the tubular member 12 is accomplished by the curved segment 13 which has a groove 14 in its upper radial surface for receiving and properly aligning the glass tubes 10 when the segment 13 is in its lower position, the segment being centrally placed in the hopper 11 whose sides slope toward the center. When the segment is moved upwardly, the glass tubes 10 slide down the groove 14 and into the tubular member 12. The segment 13 is attached to an arm 15 which is pivoted at 16 to the standard 17 which is mounted upon the bed of the flaring machine not shown, so that the tubular member 12 is substantially aligned with one of the rotatable holders. The spring 18, fastened to the standard 17 and the extension 19 of the arm 15, tends to draw the curved segment 13 down into the lower position. The segment 13 is raised by the action of the cam 20 which is driven from the power supply of the flaring machine through the belt 21, pulley 22 and the worm gearing contained in the housing 23 which is integral with the standard 24 mounted on the under side of the bed of the flaring machine. The action of the cam 20 is transmitted through the roller 25 resting thereon and pinned in the crank 26 which is caused to rise and lower about the pivot 27, to a rod 28 which is connected to the crank 26 by an adjustable ball and socket joint 29 and to the arm extension 19 by the adjustable ball and socket joint 30. The contour of the cam 20 is such that the curved segment 13 is caused to lower to receive glass tubes 10 in the groove 14, then to rise to bring the grooved end of the segment in alignment with the tubular member 12 and to remain stationary while the tubes 10 slide down into the member 12. The cycle is then repeated.

Tubing which becomes lodged at the mouth of the tubular member 12 is removed by an air blast through the tube 31. As the air blast might prevent the passage of correctly aligned tubes 10 into the tubular member 12, it is operated only while the segment 13 is in the lowered position. This action is accomplished by the engagement of the head of the screw 32, mounted on the arm 15, with the head of the screw 33, mounted in the lever 34 which controls the air valve 35, causing the air valve 35 to be opened. A spring 36, fastened to the lever 34 and to the standard 17, tends to hold the lever 34 of the air valve in closed position. An auxiliary valve 35' with the necessary adjustment is also preferably provided.

The tubular member 12 which is carried on the standard 17 has mechanism at the lower end thereof to prevent the feeding to the rotatable holders H of the flaring machine of more than one tube 10 at a time and also to prevent jamming of the tube 10 in the holders. The U-shaped member 37 is pivoted at 38 to the tubular member 12 and has at its lower end a gate 39 which normally is caused to close the passage from the lower end of the tubular member 12 by the action of the spring 40 and plunger 41 bearing against the U-shaped member 37. The spring 40 and plunger 41 are carried in the block 42 attached to the member 12. The end of the lowest tube 10 rests on the gate 39, but as the rotatable holder of the flaring machine is opened by the mechanism M as described in the application hereinbefore referred to, to receive the tube 10, the rod 43, attached to the arm 44 of the said opening mechanism is drawn downwardly and the cushioned stop 45 thereon strikes the finger 46 of the member 37 causing the gate 39 to open the passage from the member 12 and so permit the tube 10 to pass into the guide 47 of the rotatable holder. A spring 48, placed between the stop 49 attached to the rod 43 and the stop 45, minimizes strain and shock upon the engagement of the stop 45 with the finger 46.

The second lowest tube 10 is prevented from following the lowest tube 10 by the finger 50 which projects through the aperture 51 in the tubular member 12 so as to rest upon the next lowest tube 10. The finger 50 is pivoted in the lugs 52 mounted upon the tubular member 12 and is normally held in the aperture 51 by the action of the spring 53 fastened to the member 12 and to the pin 54 attached to the said finger. The upward movement of the rod 43 brings the projection 55 attached thereto into engagement with the cam 56 attached to the finger 50 so that the finger 50 is raised and allows the passage of a piece of glass tube 10, the gate 39 having been permitted to return to a closed position by the disengagement of the stop 45 and the finger 46. When the gate 39 is moved to its open position, the finger 50 is permitted to project into the aperture 51 so that only one piece of tube 10 may pass from the tubular member 12 into the guide 47.

As shown in Fig. 3, a temporary support is provided for the feed segment which may be utilized to allow adjustment of parts. A slidable pin 57 having a handle 58 is so positioned in standard 17 that, when advanced, it furnishes a support for the arm 15 in raised position. A spring-pressed ball 59 engages a groove 59' in the pin 57 when the pin is in retracted position.

In operation, glass tubes 10, cut to the desired length, are placed in the hopper 11 and the lowering and raising of the curved segment 13 causes several tubes 10 to be aligned in the groove 14. In the highest position of the segment 13, the tubes 10 slide down the groove 14 and into the tubular member 12. When the operating mechanism M causes the rotatable holder of the flaring machine to be opened to receive a tube 10, the downward movement of the rod 43 causes the stop 45 to engage the finger 46 and so to move the gate 39 into the open position to permit a tube 10 to pass into the guide 47. The finger 50, having been released from its open position, projects into the tubular member 12 to prevent the passage down the tube of the second lowest glass tube 10. When the operating mechanism causes the disengagement of the stop 45 and the finger 46, the gate 39 moves into its closed position, and the engagement of the projection 55 with the cam 56 withdraws the finger 50 from the aperture 51 sufficiently to allow what is now the lowest glass tube 10 to pass downwardly against the gate 39. When another rotatable head has been moved into position and opened to receive a glass tube 10, the finger 50 is allowed to re-enter the tubular member 12 and the gate 39 is then opened.

In Figures 7 and 8 are shown a modification especially adapted for feeding and presenting flared tubes one by one to a lamp parts assembling machine. The curved segment 62 is slotted at 63 for receiving the flared tubes 10' from the hopper 64. When the segment 62 reaches its uppermost position, the stems slide by gravity in the said slot to an inclined slotted guideway 65, along which they pass by gravity to the jaws 66 of the lamp parts assembling machine. The segment 62 is attached to an arm 67 which is pivotally mounted on the shaft 68, carried by the bracket 69 which is attached to the standard 70. The standard 70 also carries the hopper 64 and is mounted in a bracket 71 attached to the lamp parts assembling machine which is not shown. The segment 62 is raised and lowered by means of a cam (not shown) which is driven from the lamp parts machine. The cam acts through the crank 72 and the rod 73 pivotally attached thereto, the latter being pivotally connected to the arm 67 of the segment 62. The shape of the cam is such that the segment 62 is alternately lowered and raised to receive tubes and to allow their discharge.

A baffle or guard 74 is mounted just above the discharge end of the segment 62, and is pivoted at 68 through an integral extension arm. A stop 75 serves to hold the guard in the operative position. The pivotal mounting allows the guard to give if a tube should become wedged between it and the segment. This baffle or guard has the function of forcing back into the hopper any improperly placed tubes. The guideway 65 along which the flared tubes feed, is stationary. It carries at its discharge end a means for securing a uniform, uninterrupted feed of tubes to the lamp parts machine. For this purpose, there is rigidly attached to the bracket 69 a bracket 76 which supports a reciprocatable rod 77 carrying arms 78 and 79 provided respectively with substantially horizontally disposed pins 80 and 81, mounted to register with apertures on opposite sides of the slotted guideway 65. The pins 80 and 81 are spaced approximately the width of one of the tubes and by reason of the action of the cam 82 on the end of the rod 77, the rod is caused to reciprocate and to cause the pin 80 and the pin 81 to alternately pass through its aperture and to engage a tube, the result being that the line of tubes coming from the hopper is held back by the pin 80 while a tube passes down to take the place of a removed tube in the line at end of the guideway 65. The pin 80 is then withdrawn and the pin 81 becomes operative to hold the line of tubes coming from the hopper so that another tube is added to the line for delivery at the next reciprocation of the rod 77. The cam 82 is mounted on a shaft 83 which is rotated in synchronism with the movements of the segment 62 as hereinafter described. The spring 84 acts to keep the end of rod 77 against the cam 82.

At the discharge end of the guideway 65 is disposed a receiving hook 85 into which the flared tubes successively feed and in which they are held until the jaws of the assembling machine engage and remove them one by one. Adjacent thereto is mounted a means for engaging the tube next in line and drawing it back at the moment the tube in the hook is being removed. This forces the line of tubes back up the incline and upon the release of said engaging means the line advances and forces a new tube into the hook.

The said engaging means comprises a rod 86 which reciprocates in a pivoted sleeve 87 carried by an extension on bracket 76. The said rod is reciprocated and given a swinging movement by a crank 88 mounted on shaft 83. The latter is rotated by a crank 89 through link 90 attached to bell crank 91 which is rotatably mounted on shaft 68. A spring 92 tends to draw the crank 91 backwardly to retract rod 86. A stop 93 on the arm 67 is in engagement with crank 91 so that the latter is turned clockwise as the segment 62 rises to lower the rod 86 and cause the lower end thereof to enter a tube and to force said tube and the line of tubes back of it up the inclined guide for a short distance. When the segment is lowered the spring 92 causes the crank 91 to turn counter-clockwise to raise the rod 86 out of engagement with said tube and to allow the line of tubes to advance until one is seated in the hook 85. As it may be desirable to allow the segment to rise and lower without actuation of the engaging means just described, there is provided a removable detent 94 on a link 95 which engages an arm of crank 91 and holds it in raised position.

What we claim as new and desire to secure by Letters Patent of the United States is:

1. In an apparatus for feeding glass tubes to a machine for performing an operation thereon, the combination of a hopper for the glass tubes, a guideway leading to said machine, means for feeding the tubes from said hopper to said guideway and means for removing lodged tubes from the receiving end of said guideway.

2. An automatic machine for feeding glass tubes comprising a hopper adapted to contain a supply of said tubes, a scoop mounted for reciprocation through said hopper in a substantially vertical plane and so shaped as to cause one or more of said tubes to lodge therein and to feed therealong by gravity at the upper extremity of travel of said scoop, and a guideway inclined so as to allow tubes to feed along it by gravity disposed adjacent to said hopper and so as to be in line with said scoop at the upper extremity of its travel.

3. An automatic machine for feeding glass tubes comprising a hopper adapted to contain a supply of said tubes, a scoop mounted for reciprocation through said hopper in a substantially vertical plane and so shaped as to cause one or more of said tubes to lodge therein and to feed therealong by gravity at the upper extremity of travel of said scoop, a guideway inclined so as to allow tubes to feed along it by gravity disposed adjacent to said hopper and so as to be in line with said scoop at the upper extremity of its travel, and means for dislodging from said scoop tubes not properly disposed for feeding to said guideway.

4. An automatic machine for feeding glass tubes comprising a hopper adapted to contain a supply of said tubes, a scoop mounted for reciprocation though said hopper in a substantially vertical plane and so shaped as to cause one or more of said tubes to lodge therein and to feed therealong by gravity at the upper extremity of travel of said scoop, a guideway inclined so as to allow tubes to feed along it by gravity disposed adjacent to said hopper and so as to be in line with said scoop at the upper extremity of its travel, and means for delivering a jet of air to dislodge tubes not properly disposed for feeding to said guideway.

5. An automatic machine for feeding glass tubes comprising a hopper adapted to contain a supply of said tubes, a scoop mounted for reciprocation through said hopper in a substantially vertical plane and so shaped as to cause one or more of said tubes to lodge therein and to feed longitudinally therealong by gravity at the upper extremity of travel of said scoop, and a guideway inclined so as to allow tubes to feed longitudinally along it by gravity disposed adjacent to said hopper and so as to be in line with said scoop at the upper extremity of its travel.

6. An automatic machine for feeding glass tubes comprising a hopper adapted to contain a supply of said tubes, a scoop mounted for reciprocation through said hopper in a substantially vertical plane and so shaped as to cause one or more of said tubes to lodge therein and to feed therealong by gravity at the upper extremity of travel of said scoop, a guideway inclined so as to allow tubes to feed along it by gravity disposed adjacent to said hopper and so as to be in line with said scoop at the upper extremity of its travel, and automatic means at the opposite end of said guideway for releasing said tubes one by one.

7. An automatic machine for feeding glass tubes comprising a hopper adapted to contain a supply of said tubes, a scoop mounted for reciprocation through said hopper in a substantially vertical plane and so shaped as to cause one or more of said tubes to lodge therein and to feed longitudinally therealong by gravity at the upper extremity of travel of said scoop, a guideway inclined so as to allow tubes to feed longitudinally along it by gravity disposed adjacent to said hopper and so as to be in line with said scoop at the upper extremity of its travel, and automatic means at the opposite end of said guideway for releasing said tubes one by one, said means comprising a finger and means for causing it alternately to frictionally engage a tube and to release the same.

8. An automatic machine for feeding glass tubes comprising a hopper adapted to contain a supply of said tubes, a scoop mounted for reciprocation through said hopper in a substantially vertical plane and so shaped as to cause one or more of said tubes to lodge therein and to feed longitudinally therealong by gravity at the upper extremity of travel of said scoop, a guideway inclined so as to allow tubes to feed longitudinally along it by gravity disposed adjacent to said hopper and so as to be in line with said scoop at the upper extremity of its travel, and automatic means at the opposite end of said guideway for releasing said tubes one by one, said means comprising a finger and an end gate and means for causing the finger to frictionally engage the side of a tube and the end gate to open to release a tube and then causing the finger to release a tube and the end gate to close.

In witness whereof, we have hereunto set our hands this 15th day of Sept. 1922

JOHN T. FAGAN.
FRANCIS J. RIPPL